Jan. 8, 1935. B. J. HASKINS 1,987,294
WORK CENTERING CLAMP
Filed March 13, 1933
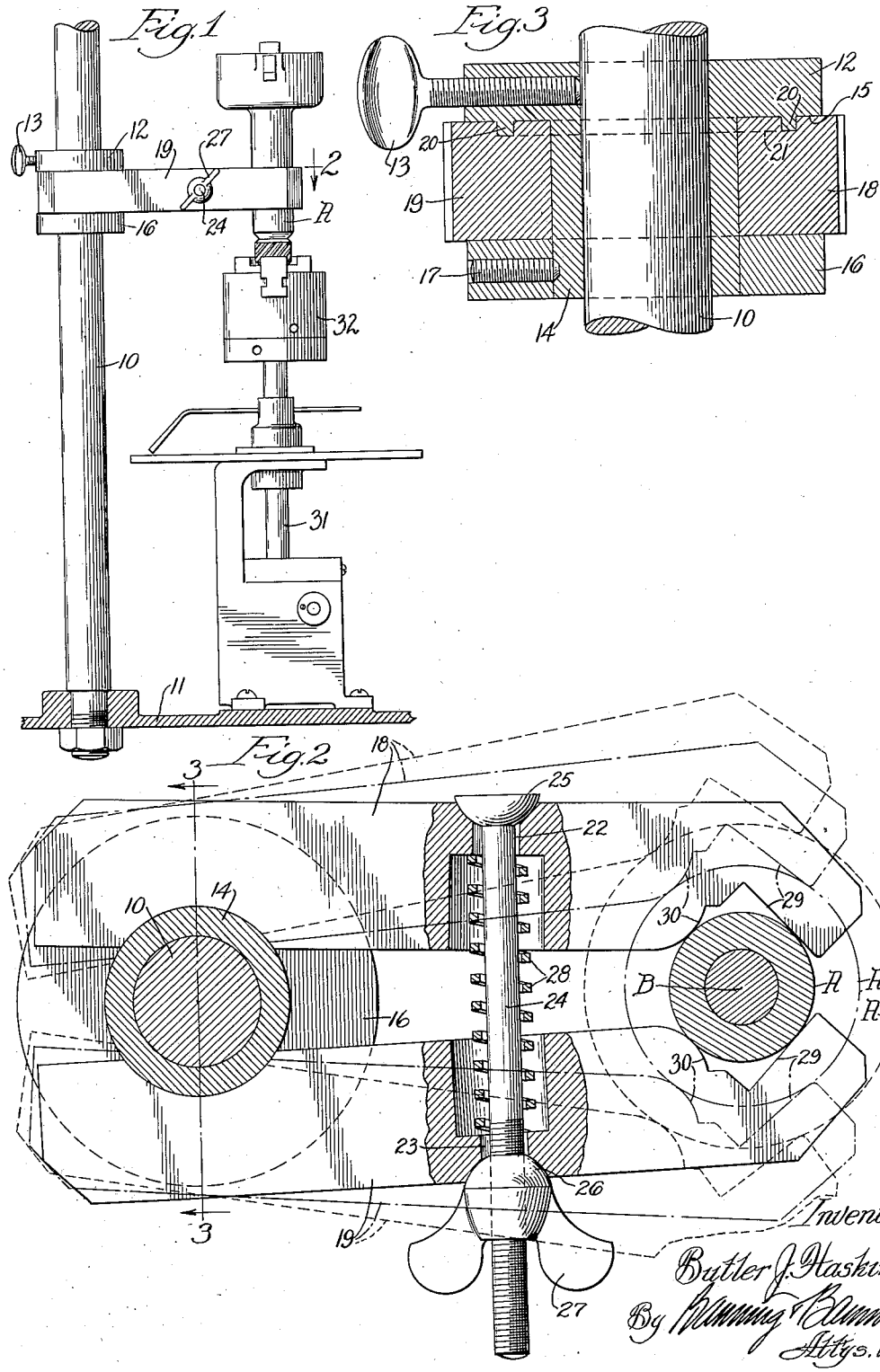

Patented Jan. 8, 1935

1,987,294

UNITED STATES PATENT OFFICE 1,987,294

WORK-CENTERING CLAMP

Butler J. Haskins, Chicago, Ill., assignor to Joseph Weidenhoff, Inc., Chicago, Ill., a corporation of Illinois Application March 13, 1933, Serial No. 660,517

6 Claims. (Cl. 81—41)

This invention relates to self-centering clamps, and particularly clamps which are adapted to hold round objects of various sizes in a fixed position with relation to another piece of mechanism.

An object of this invention is to provide a clamp which can be readily raised and lowered, and which can be swung about freely so as to clamp various objects.

Another object is to provide a clamp of this nature which has jaws of such a configuration that they will grip cylindrical objects of various diameters in such a way that the centers of these cylindrical objects will always remain at substantially the same point with respect to the clamp support.

These and other objects, as will hereinafter appear, are accomplished by this invention which is fully described in the following specification and shown in the accompanying drawing, in which—

Figure 1 is a side elevation of the clamp applied to mechanism for testing automobile distributors and the like;

Fig. 2 is an enlarged section on the line 2 of Fig. 1 showing some of the parts broken away, and showing the clamping jaws applied to cylinders of various diameters, all of the cylinders, however, being concentrically held; and Fig. 3 is a vertical section on the line 3—3 of Fig. 2.

The embodiment illustrated comprises a cylindrical post or standard 10 secured to a base 11. About the cylindrical standard is fitted a body member 12 which is adapted to be slidable and rotatable thereon, and to be held in any adjusted position by means of a set screw 13. This body member has a sleeve portion 14 and a shouldered portion 15, while a collar 16 is secured on the sleeve portion 14 by means of a set screw 17.

Thus the collar 16 and the shouldered portion 14 form two opposing shoulders between which are slidably fitted two opposing jaws 18, 19. One of the shoulders is provided with a tongue 20, while the engaging surfaces of the jaws have registering grooves 21, thereby enabling the jaws to be moved back and forth around the axis of the sleeve, the tongue and groove portions being preferably concentric with the axis of the standard.

The jaws are provided with registering openings 22, 23 through which passes a bolt 24 having at one end a spherical head 25, and the other a spherical washer 26, and a wing nut 27. The registering openings are enlarged on the inside to permit the insertion of a spring 28 which normally keeps the jaws separated as far as is permitted by the bolt. These jaws are preferably both provided with clamping openings, each of which has a straight side wall 29 which lies substantially 45° to the lengthwise dimension of the jaw, the other side of the opening having a rounded face 30.

By properly choosing the center and radius of this rounded face cylindrical objects within a certain range of sizes when clamped by these opposing jaws will contact both the straight faces 29 and both of the rounded faces 30, while the axes of all the cylinders A, A', B², etc., so held remains at substantially the same point, as clearly shown in Fig. 2. It will be observed, however, that one of the clamping jaws may have a single point of bearing on the cylinder to be clamped. In this case it would be opposite the point midway between the opposing gripping points of contact.

While this invention is intended particularly to be used in connection with a device for testing automobile distributors, it is not limited thereto but is capable of use in many situations where it is desired to grip round objects in such a way that their centers are maintained substantially constant regardless of the diameter of the object held.

In the present instance, as shown in Fig. 1, the testing mechanism comprises a shaft 31 mounted in suitable bearings and driven by a motor, not shown. The shaft 31 carries a chuck 32 which is adapted to grip the lower end of a shaft B of a distributor which has a round body A which is clamped by means of jaws, so that regardless of the diameter of the distributor its shaft will always be in alignment with the shaft 31.

For certain purposes it might be desirable to shift the axis of the distributor B, or the like, so held with respect to the axis of the shaft 31, for example. This could be provided for by making the tongue and grooves 20, 21 eccentric to the axis of the standard. By loosening the set screw 13 and rotating the body member 12 with respect to the standard, the axis of the cylinder A could be moved back and forth with respect to the axis of the shaft 31.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. A work-centering clamp comprising a cylindrical standard, a hollow body member slidable and rotatable thereon, means for securing the body member to the standard at any point of adjustment, said body member having a shouldered portion and a sleeve portion, a collar secured on the sleeve portion to form with the shouldered portion opposing shoulders, two clamping jaws rotatably mounted between said shoulders, and means for drawing said jaws together to grip an object therebetween.

2. A work-centering clamp comprising a cylindrical standard, a hollow body member slidable and rotatable thereon, means for securing the body member to the standard at any point of adjustment, said body member having a shouldered portion and a sleeve portion, a collar secured on the sleeve portion to form with the shouldered portion opposing shoulders, two clamping jaws rotatably mounted between said shoulders, and means for drawing said jaws together to grip an object therebetween, the clamping jaws and shoulders having interengaging tongue and groove portions concentric with the axis of the standard.

3. A work-centering clamp comprising a body member, two clamping jaws pivotally and concentrically connected to the body, means for drawing the jaws together, one of the jaws having a notch near its outer end, one side of the notch being substantially flat and being substantially 45° to the length of the jaw, and the other being convex so that the axes of cylinders of various sizes gripped thereby shall be substantially coincident.

4. A work-centering clamp comprising a body member, two clamping jaws pivotally and concentrically connected to the body, means for drawing the jaws together, one of the jaws having a notch near its outer end, the outer side of the notch being substantially flat and being substantially 45° to the length of the jaw, and the other being convex so that the axes of cylinders of various sizes gripped thereby shall be substantially coincident.

5. A work-centering clamp comprising a body member, two clamping jaw carrying members pivotally and concentrically connected to the body member, means for drawing the members together, one of the members having a clamping jaw near its outer end, the outer clamping side of the jaw being substantially flat and being substantially 45° to the length of the member, and the other clamping side of the jaw having a curved portion of such convexity that cylinders of various sizes will simultaneously engage the flat and curved sides of the jaw with the axes of the cylinders substantially coincident.

6. A work-centering clamp comprising a body member, two clamping jaw carrying members pivotally and concentrically connected to the body member, means for drawing the members together, each of the members having a clamping jaw near its outer end, the outer clamping side of each jaw being substantially flat and being substantially 45° to the length of the jaw carrying member, and the other clamping side of each jaw having a curved portion of such convexity that as cylinders of various sizes are placed between the opposed jaws, the cylinders will simultaneously engage the flat and curved sides with their axes substantially coincident.

BUTLER J. HASKINS.